US011975944B2

(12) United States Patent
Saarelainen et al.

(10) Patent No.: US 11,975,944 B2
(45) Date of Patent: May 7, 2024

(54) METHOD FOR DIAGNOSIS AND/OR MAINTENANCE OF A BRAKE OF A TRANSPORTATION SYSTEM, SOFTWARE PROGRAM, AND BRAKE APPARATUS

(71) Applicant: KONE Corporation, Helsinki (FI)

(72) Inventors: Antti Saarelainen, Helsinki (FI); Joni Lappalainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1320 days.

(21) Appl. No.: 16/439,202

(22) Filed: Jun. 12, 2019

(65) Prior Publication Data

US 2020/0002126 A1 Jan. 2, 2020

(30) Foreign Application Priority Data

Jun. 29, 2018 (EP) .................................... 18180669

(51) Int. Cl.
*B66B 5/00* (2006.01)
*B66B 1/32* (2006.01)
*B66B 1/34* (2006.01)

(52) U.S. Cl.
CPC .............. *B66B 5/0025* (2013.01); *B66B 1/32* (2013.01); *B66B 1/3461* (2013.01); *B66B 5/0031* (2013.01)

(58) Field of Classification Search
CPC ....... B66B 5/0025; B66B 1/32; B66B 1/3461; B66B 5/0031; B66B 5/0037;
(Continued)

(56) References Cited

U.S. PATENT DOCUMENTS

2003/0111306 A1 6/2003 Watanabe et al.
2004/0011598 A1 1/2004 Miller et al.
(Continued)

FOREIGN PATENT DOCUMENTS

CN 1446158 A 10/2003
CN 102203452 A 9/2011
(Continued)

OTHER PUBLICATIONS

European Search Report of application 18 18 0669 dated Feb. 26, 2019.

*Primary Examiner* — Jeffrey Donels
(74) *Attorney, Agent, or Firm* — Birch, Stewart, Kolasch & Birch, LLP

(57) ABSTRACT

A method for diagnosis and/or maintenance of a brake configured to apply braking force to a hoisting machine of a transportation system includes controlling the brake to start a brake control action, e.g. an opening and/or a closing action of the brake; monitoring the brake to detect a response of the brake to the brake control action, wherein in case of the response the response is detected in a predefined manner; measuring a brake operating time interval from a first point in time of starting of the brake control action until a second point in time of monitoring the brake to detect the response; and, if either the response has not been detected until the brake operating time interval reaches and/or exceeds a predetermined threshold or the response has been detected after the brake operating time interval reaches and/or exceeds the predetermined threshold, establishing an information indicating that an operation of the brake should be modified. A computer program realizing the method and a brake apparatus configured to execute the method are also disclosed.

20 Claims, 4 Drawing Sheets

Figure 1:
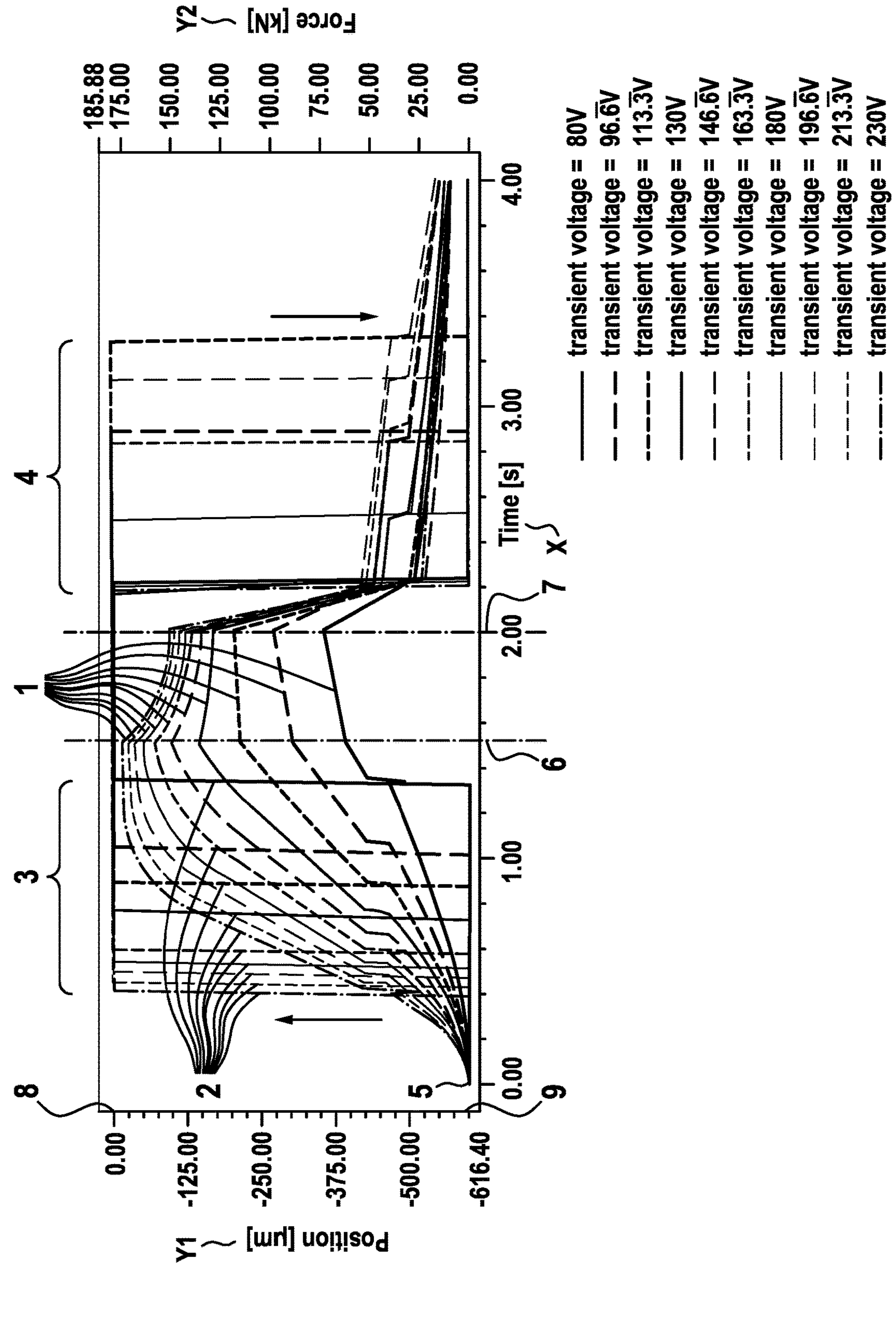

(58) Field of Classification Search
CPC ......... B66B 29/005; B66D 5/30; F16D 66/00; F16D 66/02; F16D 2066/003; G01M 99/008; G01R 31/327
See application file for complete search history.

(56) References Cited

U.S. PATENT DOCUMENTS

| | | | |
|---|---|---|---|
| 2011/0188167 | A1 | 8/2011 | Huppunen et al. |
| 2015/0047426 | A1 | 2/2015 | Ekholm et al. |

FOREIGN PATENT DOCUMENTS

| | | | | |
|---|---|---|---|---|
| JP | 2005-1823 | A | 1/2005 | |
| JP | 2010-18359 | A | 1/2010 | |
| WO | WO-2008012896 | A1 * | 1/2008 | ............... B66B 1/32 |

* cited by examiner

METHOD FOR DIAGNOSIS AND/OR MAINTENANCE OF A BRAKE OF A TRANSPORTATION SYSTEM, SOFTWARE PROGRAM, AND BRAKE APPARATUS

The invention relates to method for diagnosis and/or maintenance of a brake configured to apply braking force to a hoisting machine of a transportation system, a software program, and a brake apparatus.

Transportation systems such as elevators, escalators and the like commonly have electromechanical brakes. For example, elevators have electromechanical brakes of the hoisting machine of the elevator as safety devices to apply braking force to a traction sheave or rotating axis of the hoisting machine to brake a movement of the hoisting machine and therefore the elevator car of the elevator. There are normally two separate brakes. There are two similar brakes which are used in tandem during normal operation as well as during emergency operation. These two brakes must be able to stop an elevator car with 125% load. If one brake fails, the other brake must still hold the elevator car standstill with 115% load. The brakes thus have to be dimensioned to stop and hold an elevator car with 125% load (25% overload) at standstill in the elevator shaft. Additionally, the brakes are also used in rescue situations and also in emergency braking situations to stop the elevator car if an operational fault occurs, like in an overspeed situation of the elevator car. Further, the brakes are used to protect elevator passengers from unintended car movement with doors open in the proximity of a landing. Braking force can be produced with a suitable energy storage device mounted to the brake, such as a compression spring. The brake is opened by supplying an adequate amount of current with a brake controller to an electromagnet of the brake to resist thrust force generated by the energy storage device (e.g. compression spring). The brake is closed when the current has decreased enough such that the thrust force of the energy storage device is dominant to cause movement of the brake armature towards the braking position. In EP 1 701 904 B1, it has been suggested to test a sufficiency of the braking force. In the following, opening and closing of the brake, are defined by using the terms “picking” and “dropping”. Here, “picking” means opening of the brake. The brake armature is removed from the braking position and a rotor (and traction sheave) can rotate freely. “Dropping” means closing of the brake. The brake armature is moved to the braking position to brake a movement of the rotor.

Traditionally, an elevator is driven with steel ropes running via the traction sheave of the hoisting machine. When the brakes of the hoisting machine, also called hoisting machinery brakes, are closed to stop an elevator car movement, the steel ropes slip on the traction sheave to prevent a too high deceleration of the elevator car, which might be uncomfortable or even dangerous to elevator passengers. In an emergency stop situation for example, the brakes are controlled to close by an elevator safety chain. When the safety chain opens, a current to coils of the brake is interrupted and both brakes are applied simultaneously. While it might become possible in the future by using a more advanced safety circuit (e.g. an electronic safety controller) to allow a closing of the brakes at different times to relieve the problem of decelerating too quickly, coated ropes hamper to avoid to decelerate too quickly, wherein traditional elevators with steel ropes and lower friction did not have this problem.

To this end, a new kind of coated hoisting ropes has nowadays been introduced. These coated ropes may be traditional round ropes with a high-friction coating, or belts with high-friction coating, such as polyurethane coating. High-friction roping, like belts, is used in some elevators to reduce traction sheave diameter, wherein this roping without the coating friction would not be according to the safety regulations. Smaller diameter means higher rotating frequency for the hoisting motor and thus higher power can be achieved from a smaller motor.

On the other hand, a high-friction coating is characteristic for so called KONE Ultraropes (registered trademark), which are non-steel light ropes for high-rise elevators. Instead of steel, the load-carrying parts are made of glass fiber, carbon fiber or other suitable synthetic fibres secured inside a (high-friction) polymer jacket. Because of lightness, these ropes can be used for longer hoisting distances than traditional ropes. With traditional steel ropes the weight of the ropes would cause braking of the ropes. With this new kind of coated hoisting ropes, friction between each rope and the respective traction sheave may be so high that the ropes do not slip sufficiently when the hoisting machinery brakes have been closed to stop the elevator car movement. This could lead to increased deceleration of the elevator car.

To reduce elevator car deceleration, it is possible to redimension the energy storage device of the hoisting machinery brake to provide a lower braking force to the hoisting machine and thus lower deceleration of the elevator car. However, the redimension tends to increase an operating time of the hoisting machinery brake, i.e. time required for opening and closing of the brake. On the other hand, the brake closing time should not exceed 350 ms which may be defined as a reaction time in an overspeed situation of the elevator car near a shaft end, also called ETSL time (ETSL: Emergency Terminal Speed Limiting). In some cases, the brake closing time should not even exceed 300 ms which may be defined as a reaction time in a situation of unintended car movement with doors of the elevator car open in the proximity of a landing, also called UCMP time (UCMP: Unintended Cabin Movement Protection). When a compression spring is used as an energy storage device of the hoisting machinery brake, reaction time tends to increase in the course of time because of gradual reduction of the spring force. In case lower brake torque should be required, the reaction time of the brake restricts the spring force adjustment to this brake torque, as a low spring force is causing excessive reaction times. In order to provide sufficiently fast reaction times, a spring force adjustment window, i.e. a range of spring forces, in conformity with the allowed dimensions of the air gap between the electromagnet and the brake armature is limited such that reaction times will be reachable at conditions on site of the elevator without verification. The spring force adjustment window can be defined for a given spring arranged between the brake armature and the magnet core as a range of heights of a spacer placed between the spring and the magnet core to adjust a pre-tension of the spring. The height of the spacer is called LM dimension and the range of heights of the spacer is called LM dimensions. At a given air gap between the electromagnet and the brake armature, the height of the spring, i.e. dimension of the spring in the direction of the tension of the spring, is reduced by the height of the spacer. The spring at given air gap is thus pre-tensioned stronger with an increasing height of the spacer. At a given tension of the spring, the air gap increases with an increasing height of the spacer.

It is therefore an object of the present invention to adjust deceleration times of a transportation system.

The object is solved by the method of claim 1, the computer program product of claim 14, and the brake apparatus of claim 15. Further developments and advantageous embodiments are defined in the dependent claims.

The method according to the invention for diagnosis and/or maintenance of a brake configured to apply braking force to a hoisting machine of a transportation system comprises the following steps:

controlling the brake to start a brake control action, e.g. an opening and/or a closing action of the brake;

monitoring the brake to detect a response of the brake to the brake control action, wherein in case of the response the response is detected in a predefined manner;

measuring a brake operating time interval from a first point in time of starting of the brake control action until a second point in time of monitoring the brake to detect the response; and, if either the response has not been detected until the brake operating time interval reaches and/or exceeds a predetermined threshold or the response has been detected after the brake operating time interval reaches and/or exceeds the predetermined threshold, establishing an information indicating that an operation of the brake should be modified.

The brake operating time interval lasts from a beginning of the first point in time to an end of the second point in time, i.e. including the second point in time. So, if it is measured from a first second until a third second, the duration of the brake operating time interval or the brake operating time interval itself is three seconds.

When a response, e.g. a detected change in current and/or voltage of an electromagnet of the brake of a predefined value/values, on a brake control action, e.g. a decrease in current and/or voltage of the electromagnet of the brake, has not been detected within a predetermined threshold, e.g. 500 ms, an information indicating that an operation of the brake should be modified, e.g. an alarm, is established. In an embodiment of the first alternative of the invention, a brake operating time interval is run, e.g. started by a timer device, from starting of the brake control action and an alarm is generated when a certain value of the predetermined threshold, such as 300 ms or 500 ms, is exceeded before the response on the brake control action has been or could be detected. Establishing the information indicating that an operation of the brake should be modified occurs by generating an alarm which then indicates a brake malfunction. In this case, the brake must not be monitored until the response can be detected. The monitoring is ended once the predetermined threshold is reached or exceeded. Without having waited until the response is detected, there is no brake operating time interval from the first point in time of starting of the brake control action until the second point in time of detecting the response. Instead, the brake operating time interval ends at the predefined threshold with the information that no response has been or could be detected. Without having detected the response, i.e. the response time, but by having detected there is no response during the predetermined threshold, the first alternative of the invention represents a fast way of establishing the information indicating that an operation of the brake should be modified.

In the second alternative of the invention, when a response, e.g. a detected change in current and/or voltage of an electromagnet of the brake of a predefined value/values, on a brake control action, e.g. a decrease in current and/or voltage of the electromagnet of the brake, has been detected but not within a predetermined threshold, e.g. 500 ms, an information indicating that an operation of the brake should be modified, e.g. an alarm, is established. The response is thus detected but after the brake operating time interval reaches and/or exceeds the predetermined threshold of e.g. 500 ms. In an embodiment of the second alternative of the invention, a brake operating time interval is run, e.g. started by a timer device, from starting of the brake control action and an alarm is generated when the response is detected later than a certain value of the predetermined threshold for the brake operating time interval, such as 300 ms or 500 ms. Having monitored the brake until the response is detected, there is a brake operating time interval from the first point in time of starting of the brake control action until the second point in time of monitoring the brake to detect the response until detecting the response. Establishing the information indicating that an operation of the brake should be modified occurs by generating an alarm which then indicates a brake malfunction. The alarm can contain an information of the brake control action and the brake operating time interval for detecting the response, i.e. the response time. The second alternative of the invention therefore not only allows to establish the information indicating that an operation of the brake should be modified, but additionally allows for monitoring until the response is detected and establishing an information of the brake operating time interval for detecting the response, i.e. the response time.

The inventive method thus allows to meet required reaction times for a braking/deceleration, such as UCMP and ETSL braking, when using an elevator or escalator equipped with electromechanical hoisting machinery brakes and high friction ropes and/or belts. The inventive method allows to monitor, adjust, and control the brake such that a reaction time is within set limits, even if the brake characteristics change over the life time of the brake.

The method according to the invention allows for a bigger window/larger range of values for setting of the brake torque while ensuring the brake reaction times required by the elevator standards and codes. The inventive method can be applied as a brake adjustment method which allows to manufacture brakes which can be provided to front lines with full brake torque setting. The controlled brake torque ensures that the elevator is safe even when a counterweight and elevator car might not have final decorations and filler bits causing a balance of the elevator which varies from the calculated 50%.

The method is preferably executed by providing a brake control unit for controlling the brake, a sensor device for monitoring the brake to detect the response of the brake, and a timer device for measuring the brake operating time interval, wherein the timer device and/or the sensor device are/is provided as a device separate from the brake control unit or integrated into this unit. An internal clock of a computer can act as the timer device. Alternatively, hardware added to a conventional transportation system can represent the timer device.

In a further embodiment, the transportation system is provided with a transportation system control unit which is operated separate from the brake control unit, wherein the timer device and/or the sensor device are/is provided as a device separate from the transportation system control unit or integrated into this unit.

The operating current of the electromagnet of the brake is preferably controlled such that the brake operating time interval for detecting the response stays below or at the predetermined threshold and the controlled operating current of the electromagnet of the brake is monitored to determine or at least evaluate a wear of a friction lining of a rope or belt of the transportation system and/or to determine a misalignment of the friction lining. It is preferred that the operating current of the electromagnet of the brake is controlled automatically which enables automatized brake current setting, detection of a friction lining wear evaluation and a friction lining misalignment detection and thus preemptive maintenance, while the transportation system, e.g. an elevator, can still be in service even with slightly reduced performance, e.g. with increased start delay for moving a passenger's tread-pallet of an escalator or in case of an elevator, the elevator car.

It is preferred that the information indicates a certain kind and/or severity of failure or problem of the brake or the transportation system such that a request for modifying the operation of the brake or the transportation system is signaled to the brake control unit, the transportation system control unit or another unit outside of the transportation system such as a maintenance unit. The brake operating time interval for detecting the response can be utilized for signalling a request for modifying the operation of the brake or the transportation system, i.e. as content information of the request.

In an advantageous embodiment of the invention, the information indicating that an operation of the brake should be modified is established by comprising a corrective action which may be one or more of the following:

- controlling the brake to lower an operating current of an electromagnet of the brake to reduce the brake operating time interval for detecting the response, e.g. for restoring the operation of the brake within an allowed reaction time window;
- requesting maintenance of the brake from a service center via a remote communication link, e.g. from a remote server as a cloud-based service;
- if an increase of the brake operating time interval for detecting the response or derivative of the increase of the brake operating time interval reaches and/or exceeds another threshold, the transportation system is taken out of service because of safety reasons.

The transportation system is preferably kept in continuous operation while a maintenance visit is pending by controlling the brake to lower the operating current of the electromagnet of the brake while requesting maintenance of the brake from the service center. The operating current of an electromagnet of the brake is also called operating current of the brake, brake operating current, brake coil current, or current of the coil of the brake.

In other words: a timer device is introduced as a separate device or integrated into the elevator control unit or the brake control unit to measure a brake operating time interval or brake operating time lapse, called in short brake operating time. When the brake operation time exceeds the given threshold, a need of a corrective action is signaled. The corrective action may be one or more of the following:

- the operating current of the electromagnet of the brake is lowered with the brake controller to reduce the brake operating time, e.g. the brake operation within allowed reaction time window is restored;
- maintenance of the brake is requested from the service center, which could be embodied as a remote server, as a cloud-based service, via a remote communication link;
- if an increase of the brake operating time is remarkable/significant/outside a predetermined range or value, the elevator is taken out of service because of safety reasons;
- the operating current of the brake is lowered at the same time as the maintenance request is sent to the service center, which means that the elevator can be kept in continuous operation while a maintenance visit is pending.

It is preferred that the brake operating time interval for detecting the response is measured by measuring a brake pick time and/or a brake drop time, wherein the brake pick time is e.g. less than 500 ms and/or the brake drop time ranges e.g. between 50 and 100 ms. Pick time is defined as an opening time, i.e. time interval from a point in time of applying a (DC) voltage signal to a coil of a brake electromagnet, such that a coil current starts to gradually increase due to a given inductance of the coil, until a point in time when the brake opens such that a brake armature has moved so much that opening can be detected, e.g. with opening detection means. Correspondingly, drop time is defined as closing time, i.e. a time interval from a point in time of interrupting a voltage signal of a brake coil until a point in time when a coil current has gradually decreased so much that the brake armature has moved back to a closing position such that this movement can be detected, e.g. with closing detection means.

A brake magnet iron saturation and magnet force can then be set to meet locking and/or picking force requirements by measuring the brake pick time and/or the brake drop time. These requirements for the picking force are in relation to the opening means of the brake. The Brake can have a compression spring that provides a thrust force (normal force) that pushes a brake pad against a surface of the object to be braked. The real braking force is then calculated as the friction coefficient of the brake pad times the normal force. Picking force is the attraction force of the electromagnet that pulls the brake armature towards the electromagnet resisting thrust force of the compression spring. When voltage is applied to brake the coil of the electromagnet, current starts to raise and therefore the attraction force of the electromagnet starts to raise. At a certain point current and thus the attraction force exceeds the thrust force of the compression spring; this is the moment in time the brake starts to open. This moment is not necessarily exactly the same moment opening is detected with the opening detection means such as the sensor device, but it is directly related to it such that degradation of the brake can be monitored from increasing of the opening time.

It is particularly preferred that the brake pick time is measured by one of the following:

- measuring from a point in time of feeding voltage to the electromagnet of the brake until a point in time when a proximity switch changes its state;
- measuring from the point in time of feeding voltage to the electromagnet of the brake until a point in time when a limit switch changes its state; and
- measuring from the point in time of feeding voltage to the electromagnet of the brake until a point in time when a specific discontinuous peak pattern of the operating current of the electromagnet of the brake can be detected.

In a further embodiment, the brake drop time is measured alternatively or in addition to the brake pick time by one of the following:

- measuring from a point in time of cutting off a feeding voltage to the electromagnet of the brake until a point in time when a proximity switch changes it state;
- measuring from the point in time of cutting off the feeding voltage to the electromagnet of the brake until a point in time when a limit switch changes it state; and measuring from the point in time of cutting off the feeding voltage to the electromagnet of the brake until a point in time when a specific discontinuous peak pattern of the operating current or an operating voltage of the electromagnet of the brake can be detected.

The specific discontinuous peak pattern of the operating current of the electromagnet of the brake is advantageously verified when a brake pad of the brake contacts a surface whereon the braking force is to be applied, e.g. a brake wheel, and the peaks verified at different points in time are used to determine and/or monitor a wear and/or misalignment of the brake pad.

When the brake drop time is determined from the operating current of the brake, a misalignment of the brake pad is preferably detected from two or multiple current peak patterns while brake pad hits the corresponding surface or brake wheel. Misalignment of the brake pad can advantageously be evaluated from a difference of the peak patterns of the operating current measured at different points in time such as once an hour, a day, a week, a month etc. or in a fraction of these intervals.

A brake magnet force can thus be controlled by controlling the brake operating current. Brake magnet iron saturation and magnet force can be set to meet dropping/picking force requirements by measuring the brake pick time and the brake drop time. In case of having an excessive drop time, the brake operating current will be regulated down until the required reaction time is met. If the pick time should be excessive then the operating current will be adjusted to meet the required pick time.

The operating current of the electromagnet of the brake may be selected from/measured by using an existing brake control unit. The drop time can be measured by using an additional measurement device such as a timer device. Alternatively an internal clock of a server or local computer in connection with which the method of the invention is executed, may be used.

After the information is established, it is preferred that the information is transferred or made accessible to a remote maintenance center or a mobile service unit or the local transportation system control unit depending on a content of the information.

The setting of the operating current of the brake can be done by setting a current command. A control module separate from or integrated into the brake controller will automatically pick and drop the brake (one sided), measure the drop time and adjust the operating current of the brake until reaction times are within specification.

Such a method may comprise one, several or all of the following steps:

1) performing a one sided static brake test;
2) performing a quick stop test & deceleration measurement;
3) resetting of the spring force;
4) verifying of brake torque by performing a one sided brake test; and
5) setting of the operating current of the brake to match a new spring force Detecting of friction lining wear can be performed since an increased air gap can be detected from an increased brake pick time. Preferably, detecting of the friction lining wear occurs when the elevator performs a one-sided brake test.

Condition based maintenance is preferably performed according to the invention by monitoring of a brake pad wear by monitoring of the pick time wherein different pick times indicate a change in the air gap between the brake pad and the surface whereon the braking force is to be applied, e.g. a brake wheel. In case the pick time is out of a specified window/range of values, the elevator controller or brake controller can either set an increased operating current of the brake or increase an elevator start delay or adjust a timing of preliminary operations of the elevator. A change in the operation current outside a predetermined range required to ensure the specified reaction times, also called brake control current, launches a request for a preventive maintenance call to the service center. If the reaction times will exceed allowed limits, the elevator will perform a last call and stay on landing.

The transportation system is selected with advantage from one of an elevator, an escalator, a moving walkway, a cablecar, a railway locomotive, a railcar, a roller coaster, a conveyor, a crane, a positioning unit, and combined systems of a plurality of single units of the same. It is particularly preferred that an elevator or escalator serves as the transportation system. Most preferably, the transportation system is an elevator.

Another aspect of the invention is a software program realizing the methods according to the invention when executed on a computer. In the aforementioned software program the computer is preferably a distributed computing system wherein part of the computing system is located/arranged/operated in a cloud computing system. The software program may be embodied as a computer program product or a data carrier carrying data representing the software program.

The invention also relates to a brake apparatus for application of braking force to a hoisting machine of a transportation system configured to execute the methods according to the invention.

Other aspects, features and advantages of the invention will become apparent by the below description of exemplary embodiments alone or in cooperation with the appended drawings.

Figure 2:
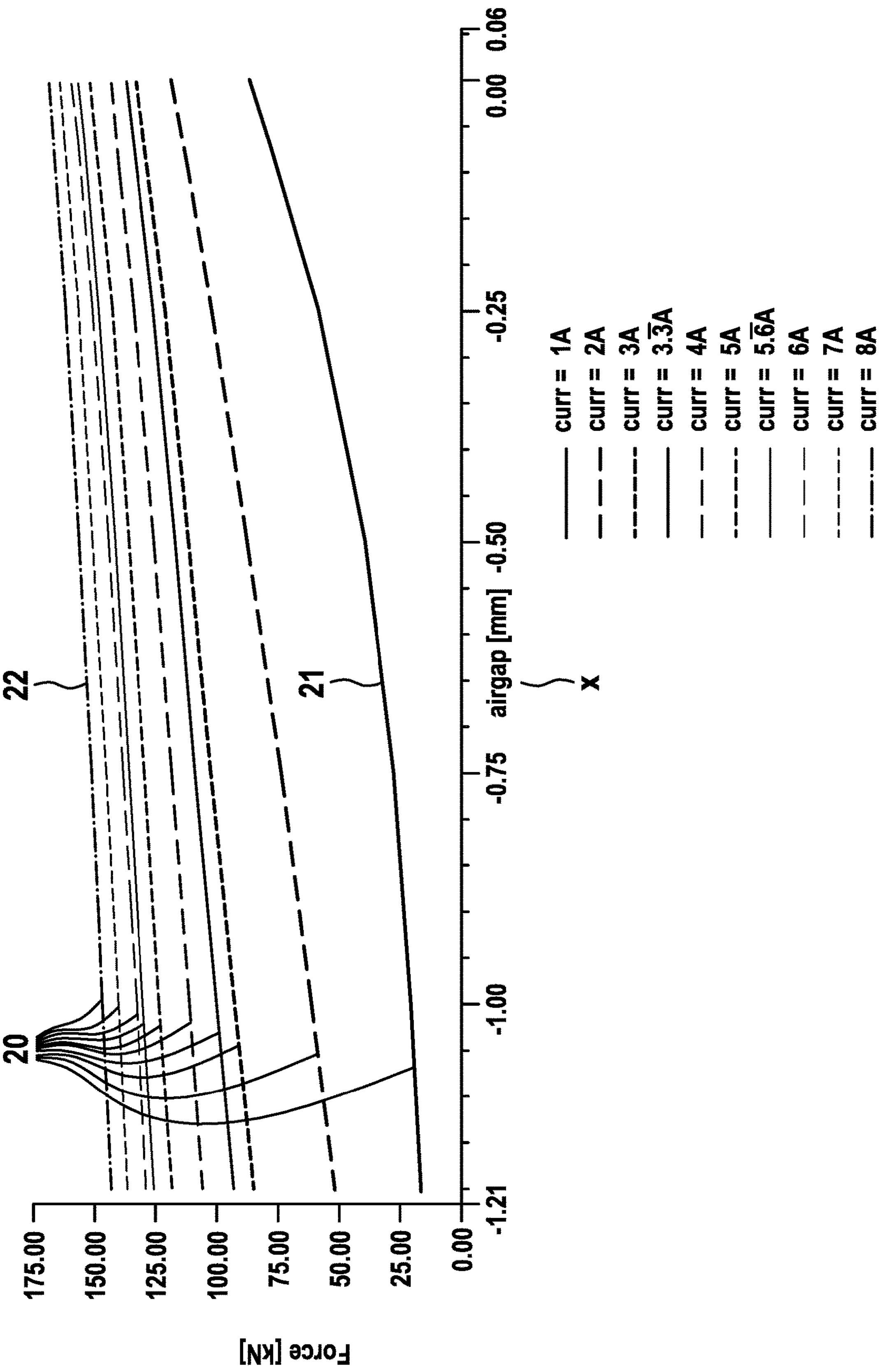
Figure 3:
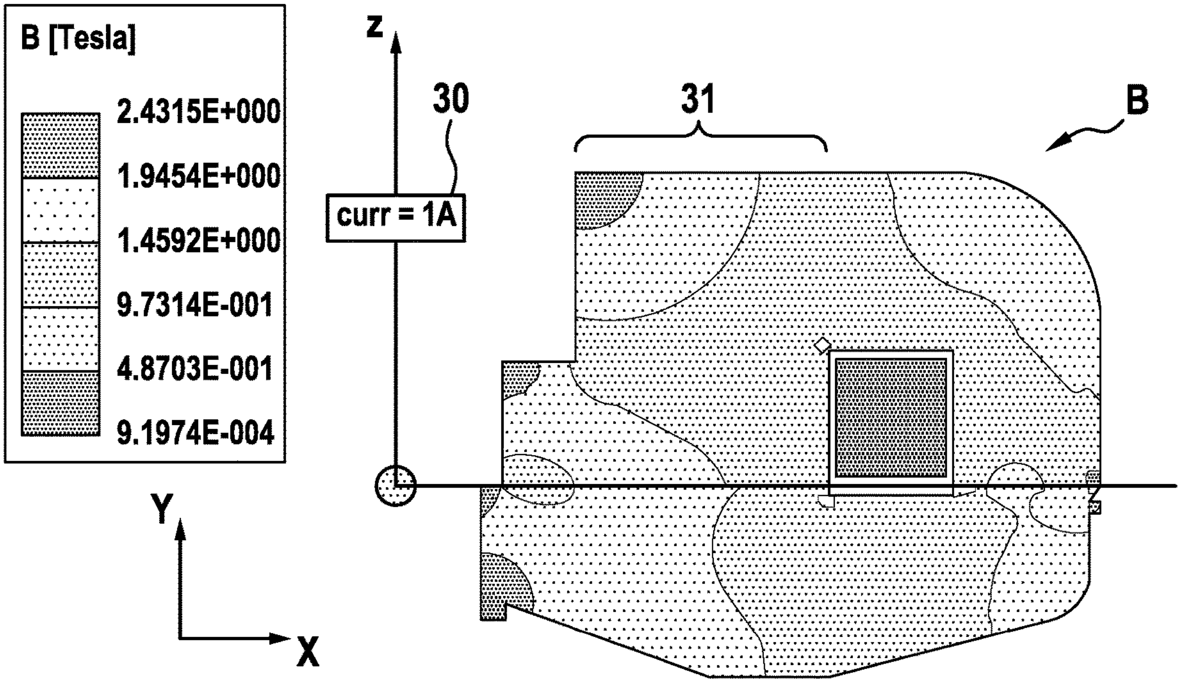
Figure 4:
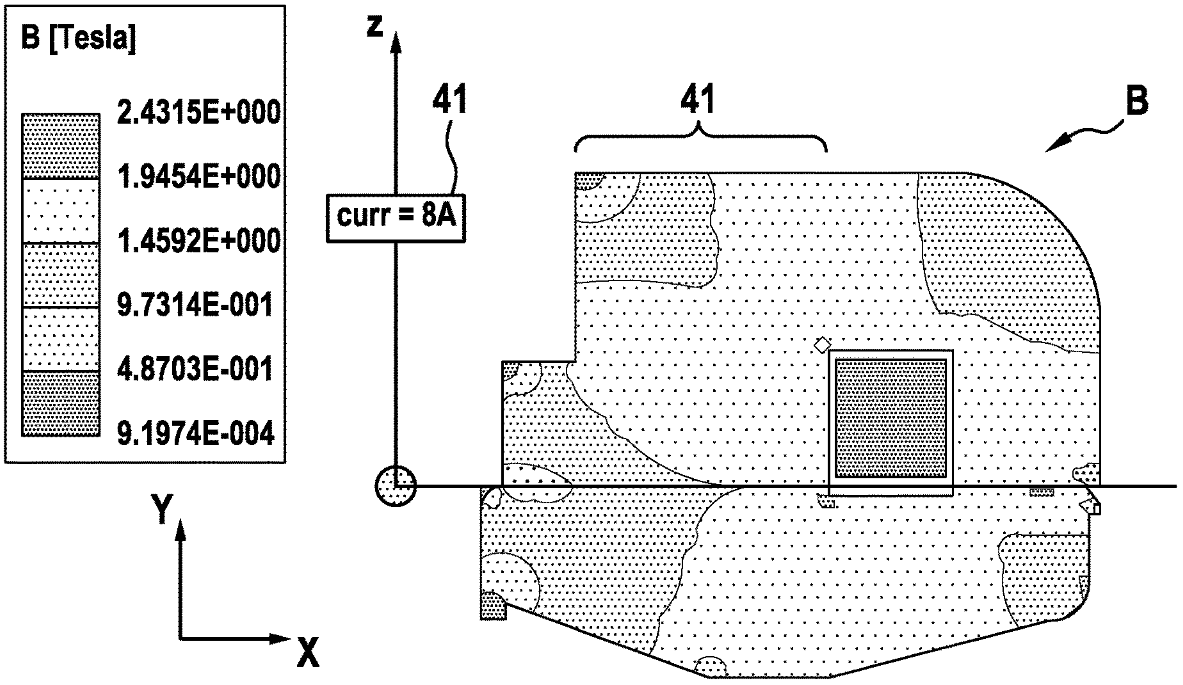
Figure 5:
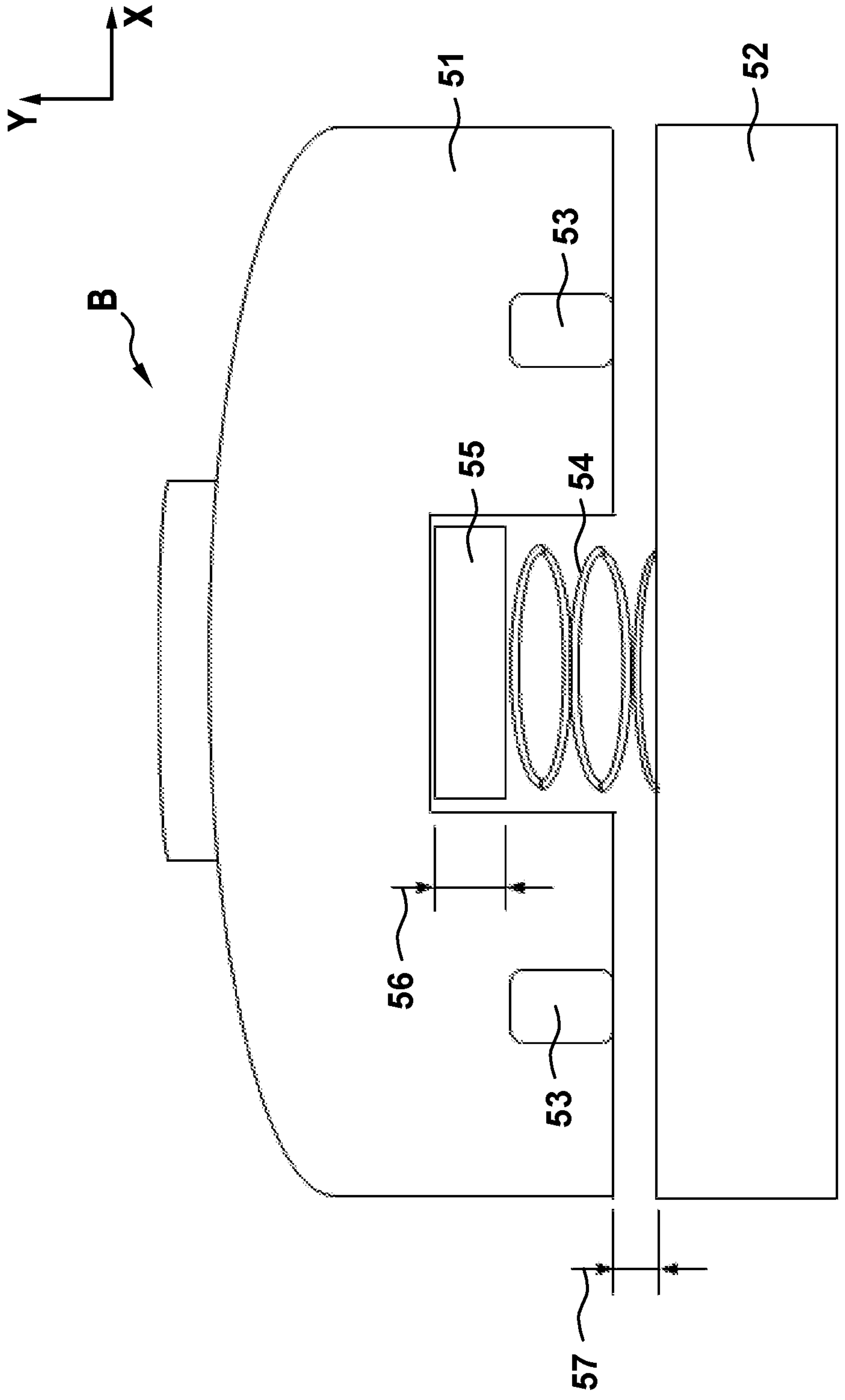

FIG. 1 is a diagram showing over time a family of curves of magnetic forces of a brake and a family of corresponding curves in position of that brake according to exemplary embodiments of the invention, FIG. 2 is a diagram showing curves of magnetic forces of a brake as a function of airgaps for different currents flowing in a coil of an electromagnet of the brake according to exemplary embodiments of the invention, FIGS. 3, 4 is a schematic diagram showing magnetic flux densities of a brake with a current of 1A (FIG. 3) and a current of 8A (FIG. 4) flowing in a coil of an electromagnet of the brake according to two other exemplary embodiments of the invention, and FIG. 5 is a cross-sectional view of a brake and the air gap between an electromagnet of the brake and an armature of the brake whereon braking force is to be applied according to another exemplary embodiment of the invention.

Now, exemplary embodiments of the invention will be described in further detail.

FIG. 1 shows the results of a transient FEM analysis on the operation of a brake according to the invention. It is shown over a time scale of 4 seconds a family of curves of magnetic forces from zero to 175 kN of a brake and a family of corresponding curves in position between zero and approximately 600 μm of that brake when applying ten voltages between 80 and 230 Volt. The time scale is represented by x, the position is indicated by y1 on the left side of the diagram, and the magnetic force is indicated by y2 on the right side of the diagram.

A family of ten curves 1 each representing a magnetic force over time is shown where the upper curve with a peak at 1.5 seconds and 175 kN is excited by applying a transient voltage of 230 V. The lower curve of the family of curves 1 revealing at 2 seconds a peak at 72.5 kN is excited by applying a transient voltage of 80 V. The eight consecutive curves between the lower and upper curves are excited with a transient voltage of 96.7 V, 113.3 V, 130 V, 146.7 V, 163.3 V, 180 V, 196.7V, and 213.3 V, respectively. Each voltage is applied as a DC voltage to a coil of an electromagnet of a brake according to the invention starting at zero seconds (see reference sign 5) until 1.5 seconds indicated by the dot dashed line 6. Alternatively to a DC voltage an alternating voltage or a combination of a DC and an alternating voltage can be applied to increase the magnetic force and the magnetic energy of the braking system.

A compression spring is comprised by the brake such that, when the magnetic force reaches a level of 40 kN, a brake armature of the brake moves away from a surface of the brake whereon braking force is to be applied. Consequently, there is a family of curves 2 shown in FIG. 1 each of which indicating an opening of the brake by moving the brake armature away from the surface of the brake whereon braking force is to be applied within a fraction of a second by changing its position by approximately 600 μm. The opening of the brake occurs depending on the transient voltage applied to the coil in a time interval 3 between approximately 0.4 and 1.3 seconds. As the driving voltage is lowered, the pick time of the brake is lengthened from ca. 0.4 seconds at 230 V to ca. 1.3 seconds at 80 V of voltage driving the coil of the electromagnet of the brake. As the pick time means the time from applying the DC voltage signal to the coil of brake electromagnet, such that coil current starts to gradually increase due to high inductance of the coil, to the time when brake has opens, such that the brake armature has moved so much that opening can be detected with opening detection means, the pick time tends to become longer when the applied voltage is smaller—as shown in the time interval 3 of FIG. 1.

In the time interval between 1.5 and 2 seconds, the DC voltage for all curves of the family of curves 1 is set equal to 113.3 V (see dot dashed lines 6 and 7) leading to an increase for the three lower curves and a decrease in magnetic force for the other curves.

At 2 seconds as indicated by the dot dashed line 7, a counter-voltage is applied to the coil in the electromagnetic operation of the brake to decrease the magnetic force in the braking system as fast as possible. The drop time means the time from interrupting the voltage signal of brake coil to the time that the coil current has gradually decreased due to the inductance of the coil so much that the brake armature has moved back to closing position such that this movement can be detected. The dropping of the brake, i.e. closing of the brake, occurs depending on the transient voltage applied to the coil in the time interval 4 between approximately 2.2 and 3.3 seconds. As the driving voltage is lowered, the drop time of the brake is shortened from ca. 3.3 seconds at 230 V in the time interval between zero and 1.5 seconds to ca. 2.2 seconds at 80 V of voltage initially driving the coil of the electromagnet of the brake. Therefore, with decreasing voltage, the resultant magnetic force, and as a result thereof the stored magnetic energy of the braking system is also decreased, allowing for faster closing operation of the brake, as the counter-voltage of the electromagnetic operation is sufficient for diminishing the magnetic energy of the braking system low enough to let the compression spring release the brake to apply the braking force onto the surface whereon braking force is to be applied.

By determining the pick time and/or the drop time, it is possible to adjust the driving voltage to meet the required pick times and/or drop times from FIG. 1 without the transportation system having to go out of service for maintenance.

The diagram of FIG. 2 shows curves of static magnetic forces of a brake as a function of airgaps for different currents flowing in a coil of an electromagnet of the brake according to the invention. The air gap ranges between zero and 1.21 mm as indicated by the scale x. The magnetic force ranges between 15 and 175 kN depending upon which of the ten curves is monitored. The lower curve represents a brake comprising a coil through which a current of 1 A is flowing. The upper curve represents a coil which is driven with a current of 8 A. the curves between the lower and upper curves indicate coils whereto currents of 2 A, 3 A, 3.3 A, 4 A, 5 A, 5.6 A, 6 A, and 7 A, respectively, are applied. These currents are DC currents. However, alternatively to a DC current, an alternating current or a combination of a DC and an alternating current can be applied to increase the magnetic force and the magnetic energy of the braking system. While at 8 A of current the increase in magnetic force is almost linear with decreasing air gap (from left to right in x), there is a steady increase of the derivative in force when the air gap is decreased at a current of 1 A.

The inductance is inversely proportional to the air gap or air gap length such that, when the air gap lengthens, inductance diminishes. When the air gap increases, for example because of wearing of a brake pad, the magnetic force decreases and the thrust force of the compression spring relative to the magnetic force tends to increase. When the air gap widens, a higher brake current is needed to open the brake. Drop time includes also the travel time of the brake armature from open to close which increases when the air gap is widened. Additionally, if the brake current is high then the brake iron of the magnet core electromagnet is highly saturated. This also increases the drop time. It takes time before the brake current has dimished so much that the brake armature starts to move. The travel time is short, but the hold time before the brake current has diminished and the brake armature starts to move is the dominating time for the drop time. On the other hand, when the air gap between the brake armature and the magnet core of the electromagnet of the brake increases, more brake current is needed to pick the brake.

Each of FIG. 3 and FIG. 4 show a schematic diagram of the same brake B in cross sectional view X and Y with magnetic flux densities of the brake with a current of 1 A and 8 A, respectively, flowing in a coil of an electromagnet of the brake (see reference signs 30 in FIGS. 3 and 40 in FIG. 4). Comparing both figures, at the corners the distributions of magnetic flux become more inhomogeneous with increasing current. There are three flux regimes e.g. in area 31 in FIG. 3 and in the corresponding area 41, there are four flux regimes in FIG. 4. In particular, the current of 8 A results in a highly saturated material in FIG. 4 indicated by the region 42. Also, inductance is not linear, but the brake coil current is so high that it leads to saturation of the iron around the brake coil. This saturation tends to make the brake slower (see increasing pick time and drop time in FIG. 1 with increasing voltage leading at given resistance to an increasing current in the coil). This means that extra thrust force of the compression spring has been needed to meet the pick and drop time requirements.

However, by controlling the operating current of the electromagnet of the brake, i.e. the driving current of the coil, such that the brake operating time interval stays below or at the predetermined threshold, the pick time and/or drop time can be controlled with the least possible current avoiding a saturation as shown in FIG. 4.

In FIG. 5, a cross-sectional view of a brake B and an air gap 57 is shown between an electromagnet of the brake B and a brake armature 52 of the brake B. The electromagnet comprises a magnet core 51 and a coil 53. The cross-sectional view of the brake B is shown in the X-Y plane. A spring 54 is arranged between the armature 52 and the magnet core 51 which is compressed as long as a current is flowing through the coil 53 to generate an attractive force between the electromagnet and the armature 52 which is larger than the thrust force of the spring 54 to keep the brake B open. Instead of a single spring 43, several springs may be used. If the attractive force between the armature 52 and the electromagnet diminishes by reducing the current through the coil 53 and becomes smaller than the thrust force of the spring 54, the brake B drops. Therefore, in case of a power outage, the brake B is dropped automatically by the spring 54 spreading the armature 52 and the magnet core 51 from each other. Between the spring 54 and the magnet core 51, there is arranged a spacer 55, also called LM. The height 56 of the spacer 55 is selected to adjust a value of the air gap 57. The value of the air gap 57 is thus determined by the shape and dimensions of the magnet core 51, a height of the spring 54 and the height 56 of the spacer 55. The bigger the dimension of the air gap 57 becomes, the smaller the thrust force of the compression spring 54 and the magnetic force/brake torque of the electromagnet of the brake B must be.

The invention provides a method for allowing a bigger brake torque and spring force window or range from current brakes, still ensuring the required brake reaction times for UCMP and ETSL braking. It is therefore not necessary anymore that a given brake control module is providing one preset current value only which must provide fast enough reaction times with full spring force. The method according to the invention allows to control and/or reduce and/or avoid excessive brake torque which has not been addressed with conventional rope elevators with conventional single wrap roping where rope slip has limited maximum deceleration. In case of an over saturation of the magnet iron due to an excessive current (force) compared to the spring force that the magnet force must overcome, a counter voltage peak can reduce the brake magnet force to a state in which a set spring force can create initial air gap between magnet and armature. This way, the initial air gap will be created by the counter voltage such that the applied spring force reaction time of the brake will not exceed reaction time limits. Friction lining wear and misalignment detection in the prior art is based on preventive maintenance visits by service personnel.

By adjusting the brakes according to method described above, it is possible to use a friction lining which has a bigger fluctuation in the coefficient of friction than the fluctuation able to be used previously.

A technical feature or several technical features which has/have been disclosed with respect to a single or several embodiments discussed herein before, e.g. the embodiment of condition based maintenance with respect to an elevator, may be present also in another embodiment, e. g. with respect to an escalator or crane, except it is/they are specified not to be present or it is impossible for it/them to be present for technical reasons.

The invention claimed is:

1. A method for diagnosis and/or maintenance of a brake configured to apply a braking force to a hoisting machine of a transportation system, comprising:

controlling the brake to start a brake control action;

monitoring the brake to detect a response of the brake to the brake control action, wherein in case of the response the response is detected in a predefined manner;

measuring a brake operating time interval from a first point in time of starting of the brake control action until a second point in time of monitoring the brake to detect the response; and if the response has not been detected before the brake operating time interval reaches a first predetermined threshold, establishing an information indicating that an operation of the brake needs to be modified, wherein the information indicating that an operation of the brake needs to be modified is established by comprising a corrective action which includes one or more of the following:

controlling the brake to lower an operating current of an electromagnet of the brake to reduce the brake operating time interval for detecting the response; and if an increase of the brake operating time interval for detecting the response exceeds a second threshold or a derivative of the increase of the brake operating time interval exceeds a third threshold, the transportation system is taken out of service.

2. The method of claim 1, further comprising a brake control unit for controlling the brake, a sensor device for monitoring the brake to detect the response of the brake, and a timer device for measuring the brake operating time interval, wherein at least one of the timer device and the sensor device is a device separate from the brake control unit or integrated into this unit.

3. The method of claim 1, wherein the information is established to further indicate a type or severity of a problem of the brake or the transportation system such that a request for modifying the operation of the brake or the transportation system is signaled to the brake control unit, the transportation system control unit or another unit outside of the transportation system.

4. The method of claim 1, wherein the information indicating that an operation of the brake needs to be modified is established by comprising a corrective action which includes requesting maintenance of the brake from a service center via a remote communication link.

5. The method of claim 1, wherein the transportation system is kept in continuous operation by controlling the brake to lower the operating current of the electromagnet of the brake while requesting maintenance of the brake.

6. The method of claim 1, wherein the controlled operating current of the electromagnet of the brake is monitored to determine a wear of a system brake pad and/or a misalignment of the brake pad.

7. The method of claim 1, wherein the brake operating time interval for detecting the response is measured by measuring a brake pick time and/or a brake drop time, wherein the brake pick time is less than 500 ms and/or the brake drop time ranges between 50 and 100 ms.

8. The method of claim 7, wherein a brake magnet iron saturation and magnet force are set to meet dropping and/or picking force requirements by measuring the brake pick time and/or the brake drop time.

9. The method of claim 7, wherein the brake pick time is measured by one of the following:

measuring from a point in time of feeding voltage to the electromagnet of the brake until a point in time when a proximity switch changes its state;

measuring from the point in time of feeding voltage to the electromagnet of the brake until a point in time when a limit switch changes its state; and measuring from the point in time of feeding voltage to the electromagnet of the brake until a point in time when a peak of the operating current of the electromagnet of the brake can be detected.

10. The method of claim 7, wherein the brake drop time is measured by one of the following:

measuring from a point in time of cutting off a feeding voltage to the electromagnet of the brake until a point in time when a proximity switch changes it state;

measuring from the point in time of cutting off the feeding voltage to the electromagnet of the brake until a point in time when a limit switch changes it state; and measuring from the point in time of cutting off the feeding voltage to the electromagnet of the brake until a point in time when a peak of the operating current or an operating voltage of the electromagnet of the brake can be detected.

11. The method of claim 9, wherein the peak of the operating current of the electromagnet of the brake is verified when a brake pad of the brake contacts a surface whereon the braking force is to be applied, and the peaks detected at different points in time are used to determine a wear and/or misalignment of the brake pad.

12. The method of claim 1, wherein, after the information is established, it is transferred or made accessible to a remote maintenance center or a mobile service unit or the local transportation system control unit depending on a content of the information.

13. The method of claim 1, wherein the transportation system is selected from one of an elevator, an escalator, a moving walkway, a cablecar, a railway locomotive, a railcar, a roller coaster, a conveyor, a crane, a positioning unit, and combinations thereof.

14. A non-transitory computer readable medium storing a software program that when executed on a computer; diagnose and/or maintain a brake configured to apply a braking force to a hoisting machine of a transportation system comprising:

controlling the brake to start a brake control action;

monitoring the brake to detect a response of the brake to the brake control action, wherein in case of the response, the response is detected in a predefined manner;

measuring a brake operating time interval from a first point in time of starting of the brake control action until a second point in time of monitoring the brake to detect the response; and if the response has not been detected before the brake operating time interval reaches a first predetermined threshold, establishing an information indicating that an operation of the brake needs to be modified, wherein the information indicating that an operation of the brake needs to be modified is established by comprising a corrective action which includes one or more of the following:

controlling the brake to lower an operating current of an electromagnet of the brake to reduce the brake operating time interval for detecting the response; and if an increase of the brake operating time interval for detecting the response exceeds a second threshold or a derivative of the increase of the brake operating time interval exceeds a third threshold, the transportation system is taken out of service.

15. A brake apparatus for application of a braking force to a hoisting machine of a transportation system, wherein the brake apparatus comprises:

a controller for controlling the brake;

a sensor for monitoring the brake to detect the response of the brake; and a timer for measuring the brake operating time interval, wherein the controller is configured to:

control the brake to start a brake control action;

monitor the brake to detect a response of the brake to the brake control action, wherein in case of the response;

measure a brake operating time interval from a first point in time of starting of the brake control action until a second point in time of monitoring the brake to detect the response; and if the response has not been detected before the brake operating time interval reaches a first predetermined threshold, establishing an information indicating that an operation of the brake needs to be modified, wherein the information indicating that an operation of the brake needs to be modified is established by comprising a corrective action which includes one or more of the following:

control the brake to lower an operating current of an electromagnet of the brake to reduce the brake operating time interval for detecting the response; and if an increase of the brake operating time interval for detecting the response exceeds a second threshold or a derivative of the increase of the brake operating time interval exceeds a third threshold, the transportation system is taken out of service.

16. The method of claim 2, wherein the information is established to further indicate a type of severity of a problem of the brake or the transportation system such that a request for modifying the operation of the brake or the transportation system is signaled to the brake control unit, the transportation system control unit or another unit outside of the transportation system such as a maintenance unit.

17. The method of claim 2, wherein the information indicating that an operation of the brake needs to be modified is established by comprising a corrective action which includes requesting maintenance of the brake from a service center via a remote communication link.

18. The method of claim 3, wherein the information indicating that an operation of the brake needs to be modified is established by comprising a corrective action which includes requesting maintenance of the brake from a service center via a remote communication link.

19. The method of claim 2, wherein the transportation system is kept in continuous operation by controlling the brake to lower the operating current of the electromagnet of the brake while requesting maintenance of the brake.

20. The method of claim 3, wherein the transportation system is kept in continuous operation by controlling the brake to lower the operating current of the electromagnet of the brake while requesting maintenance of the brake.

* * * * *